(12) United States Patent
Crane-Baker

(10) Patent No.: US 8,311,883 B2
(45) Date of Patent: Nov. 13, 2012

(54) METHOD AND SYSTEM FOR SORTING ONLINE ADVERTISEMENTS

(75) Inventor: James Crane-Baker, Santa Barbara, CA (US)

(73) Assignee: RedeParede.com Inc., Santa Barbara, CA (US)

(*) Notice: Subject to any disclaimer, the term of this patent is extended or adjusted under 35 U.S.C. 154(b) by 962 days.

(21) Appl. No.: 11/861,646

(22) Filed: Sep. 26, 2007

(65) Prior Publication Data

US 2009/0083095 A1 Mar. 26, 2009

(51) Int. Cl.
*G06Q 30/00* (2012.01)

(52) U.S. Cl. .................. 705/14.4; 705/14.49; 705/14.6; 705/14.73

(58) Field of Classification Search .................. 705/14.4, 705/14.49, 14.6, 14.73
See application file for complete search history.

(56) References Cited

U.S. PATENT DOCUMENTS

| | | | | |
|---|---|---|---|---|
| 2005/0043060 | A1* | 2/2005 | Brandenberg et al. | 455/558 |
| 2005/0171955 | A1* | 8/2005 | Hull et al. | 707/10 |
| 2005/0223002 | A1* | 10/2005 | Agarwal et al. | 707/7 |
| 2005/0256866 | A1* | 11/2005 | Lu et al. | 707/5 |
| 2006/0069613 | A1* | 3/2006 | Marquardt | 705/14 |
| 2007/0226374 | A1* | 9/2007 | Quarterman et al. | 709/250 |
| 2010/0030638 | A1* | 2/2010 | Davis et al. | 705/14.43 |

OTHER PUBLICATIONS

Golbeck, J., Filmtrust: movie recommendations from semantic web-based social networks. Consumer Communications and Networking Conference, 2006. CCNC 2006. 3rd IEEE, vol. 2, No. pp. 1314-1315, Jan. 8-10, 2006.*

Jennifer Ann Golbeck, Computing and Applying Trust in Web-Based Social Networks.University of Maryland, College Park, 2005. Publication No., 3178583. Abstract, 2 pgs.*

Massa, P., Avesani, P.: Trust-aware Collaborative Filtering for Recommender Systems. In: Proceedings of the International Conference on Cooperative Information Systems (CoopIS) (2004). 17 pgs.*

* cited by examiner

*Primary Examiner* — Lynda Jasmin
*Assistant Examiner* — Timothy Padot
(74) *Attorney, Agent, or Firm* — Frommer Lawrence & Haug LLP; Thomas F. Presson

(57) ABSTRACT

A method and system for sorting online advertisements to enable users of online advertising networks, auctions, merchants, etc. to identify known or trusted parties are provided. Users designate other users as friends. When a user searches for or browses through advertisements, those advertisements posted by the user's friends are easily identified. Advertisements posted by members of the user's network (i.e., friends of the user's friends) are also easily identified.

10 Claims, 11 Drawing Sheets

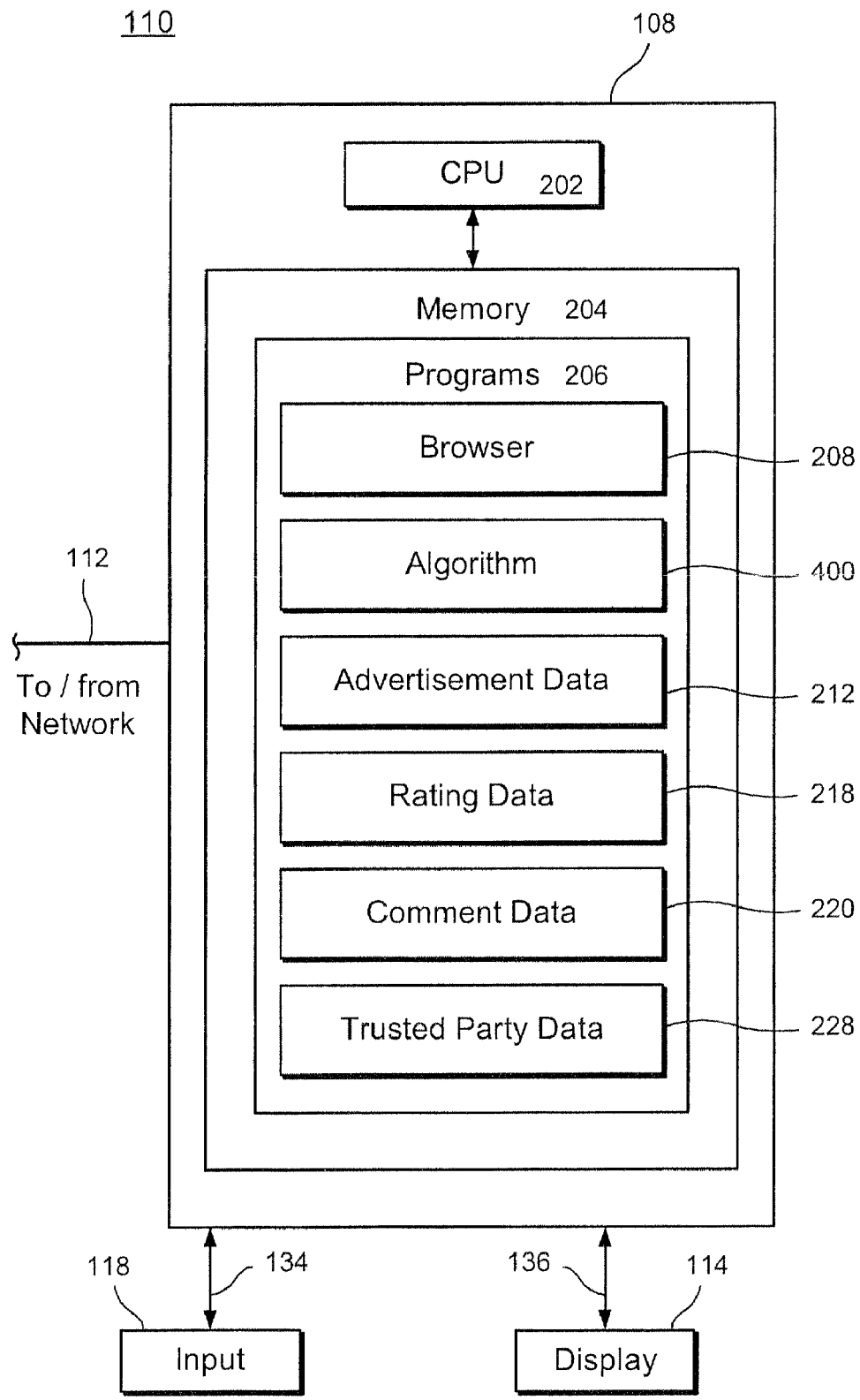
F I G. 2

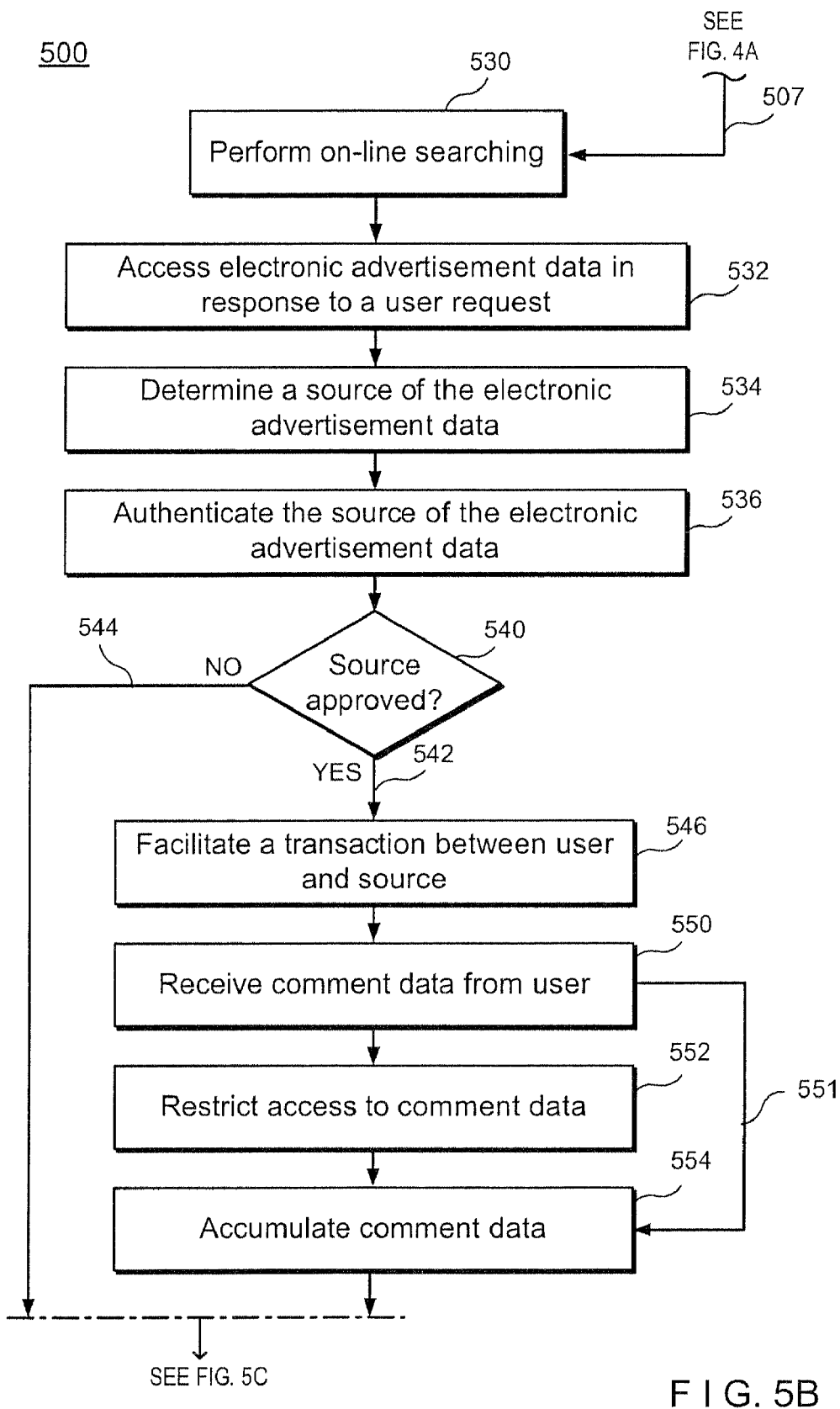

METHOD AND SYSTEM FOR SORTING ONLINE ADVERTISEMENTS

CROSS REFERENCE TO RELATED APPLICATIONS

No related applications.

BACKGROUND

1. Field of the Invention

This invention relates generally to a method and system for sorting online advertisements. More specifically, the present invention is directed to a method and system for sorting online advertisements that allows users to identify advertisements from known or trusted parties.

2. Background Discussion

The Internet is an exciting tool that not only puts vast information at consumer's fingertips, but expands shopping options. With only a few clicks of a mouse, one can go online to buy just about anything—from airline tickets to rare antiques. The Internet has spawned a new type of commerce, electronic commerce (or e-commerce).

Whether buying direct from a business, an individual, or an Internet auction, shopping online can be fun, easy, practical, and economical. But, just as in the "bricks and mortar" world, the Internet shopping experience can be marred by unscrupulous dealers constantly devising new ways to deceive consumers out of their money.

Buyers and participants in online commercial transactions can reduce their financial risk when shopping on the Internet by not using wire transfers to pay for goods. If one wires money to buy an item from an Internet shopping site—either through a money transmitter or directly to a seller's bank account—and something goes wrong, it is very likely that the consumer will lose his payment and have no recourse. Although wire transfers are not appropriate when doing business with a stranger, they can be useful to send funds to a known or trusted party. Being able to identify those advertisements that are posted by known or trusted buyers and sellers therefore remains a central concern of all those who engage in e-commerce.

Another Internet scam, commonly referred to as "phishing" involves Internet criminals who send spam or pop-up messages to lure personal information (credit card numbers, bank account information, Social Security numbers, passwords, or other sensitive information) from unsuspecting victims. "Phishers" send an email or pop-up message that claims to be from a known or trusted individual, business, or organization that one may have dealt with in the past (e.g., an online merchant, an Internet service provider (ISP), bank, online payment service, or government agency). The message may ask the consumer to "update," "validate," or "confirm" his account information. The sole purpose of such a scheme is to facilitate identify theft. Although steps may be taken to minimize the risk posed by phishers (e.g., deleting random emails that ask a user to confirm or divulge financial information upon receipt), the only true way to protect against fraudulent merchants is to know or trust the party with whom one is dealing.

Check overpayment scams may also be used to defraud unsuspecting sellers. This scam starts when a stranger responds to a seller's posting or advertisement, and offers to use a cashier's check, personal check, or corporate check to pay for the item being sold. A posting is any announcement (e.g., an advertisement, an offer, a message, etc.) sent to and displayed on an electronic message board. At the last minute, the so-called buyer comes up with a reason for writing the check for more than the purchase price, and asks the seller to wire back the difference after the check is deposited. After the check has been deposited and the funds wired back to the "buyer," the check bounces, leaving the seller liable for the entire amount.

Online merchants and Internet auction sites offer buyers a "virtual" flea market of new and used merchandise from around the world and give sellers a global storefront from which to market their goods. But with added convenience comes added risk. Conducting business over the Internet causes many users to become frustrated with the current e-commerce business model. Most complaints by users generally deal with late shipments, no shipments, shipments of products that are not the same quality as advertised, sham online payment or escrow services, and fraudulent dealers who lure bidders from legitimate sites with seemingly better deals. Furthermore, many users complain of seller misconduct, but in some cases, the buyers are targeted.

Therefore, it would be an advancement in the state of the art to provide a method and a system for sorting online advertisements into categories that will enable users to identify known or trusted parties.

SUMMARY

The benefits of dealing with a known or trusted party extend beyond enhanced safety and security. A seller who is familiar with a particular buyer's tastes and preferences can help that buyer efficiently locate and purchase desired goods. Similarly, a buyer who is familiar with the quality or selection of a particular seller's goods can make quick and efficient purchasing decisions. The ability to identify advertisements posted by known or trusted parties can therefore facilitate and promote more efficient e-commerce.

Online advertisements may be used in various arenas of e-commerce (e.g. online advertising networks, online stores, online auctions, etc.). An online store may include advertisements for new or used goods for stated prices that are negotiable or nonnegotiable. On the other hand, advertisements can also be employed in seller's auctions, where a single entity is selling and multiple entities are bidding to purchase. Alternatively, an auction can be a buyer's auction, in which there is a single buyer and multiple sellers bid. Finally, an auction can be two-sided, with multiple buyers and sellers acting simultaneously. Embodiments of the present invention apply to any website that offers users access to advertisements (e.g. online advertising networks, online auctions, merchants, etc.). Furthermore, the term "goods", as used herein, means any products and/or services, or object available, or the subject of a commercial transaction, such as an online transaction, also described as an e-commerce transaction.

Embodiments of the present invention are directed to a system and method that sorts online advertisements to enable users of online advertising networks, auctions, merchants, etc. to identify known or trusted parties.

Accordingly, one embodiment of the present invention is directed to a method for sorting online advertisements enabling users of online advertising networks to identify known or trusted parties. This method includes allowing a first user to designate other users as "trusted primary sources" or "friends," and to indicate to the first user that one of the "trusted primary sources" or "friends" posted an advertisement. The method also includes indicating to the first user that a "friend" of his "friend" (a "trusted secondary source")

posted an advertisement. The first user's extended network includes that user's friends, as well as friends of that user's friends.

Another embodiment of the present invention is directed to a method of providing electronic advertisements ("the method"), which includes establishing one or more trusted primary sources and one or more trusted secondary sources. The trusted secondary sources are a function of one or more trusted primary sources. Electronic advertisement data is accessed and a source of the electronic advertisement data is authenticated by verifying that the source of the electronic advertisement data is either a trusted primary source or a trusted secondary source. Items corresponding to electronic advertisement data from an authenticated source are selected and a transaction is performed that relates to the selected items when the source of the electronic advertisement data has been authenticated.

Yet another embodiment of the present invention is directed to the method described above and also includes searching the electronic advertisement data utilizing one or more search criteria.

Yet another embodiment of the present invention is directed to the method described above and also includes wherein the search criteria includes: tag data, date data, location data, or cost data.

Yet another embodiment of the present invention is directed to the method described above and also includes displaying a number of times particular electronic advertisement data has been accessed.

Yet another embodiment of the present invention is directed to the method described above and also includes generating comment data by users, the comment data related to a particular transaction.

Yet another embodiment of the present invention is directed to the method described above and also includes accessing comment data associated with particular electronic advertisement data and displaying the comment data.

Yet another embodiment of the present invention is directed to the method described above and also includes restricting access to the comment data.

Yet another embodiment of the present invention is directed to the method described above and also includes classifying one or more trusted primary sources of electronic advertisement data or one or more trusted secondary sources of electronic data as having enhanced authenticity.

Yet another embodiment of the present invention is directed to the method described above and also includes associating selected electronic advertisement data with an identifier to facilitate subsequent retrieval of the electronic advertisement data.

Yet another embodiment of the present invention is directed to the method described above and also includes establishing a category of preferred sources of electronic advertisement data.

Yet another embodiment of the present invention is directed to the method described above and also includes sorting the electronic advertisement data based on price, geographic location, age, or condition of the good or services.

Yet another embodiment of the present invention is directed to the method described above and also includes assigning a reliability rating to the trusted primary source or the trusted secondary source.

Yet another embodiment of the present invention is directed to a method of providing online advertisements. The method includes establishing one or more user accounts and establishing trusted primary sources for each user account and trusted secondary sources for each user account. The trusted secondary sources are a function of one or more trusted primary sources. Electronic advertisement data is accessed in response to a user's command. A source of the electronic advertisement data is identified. The source of the electronic advertisement data is authenticated by verifying that the source is either a trusted primary source or a trusted secondary source associated with the user account. A transaction is facilitated when the source of the electronic advertisement data has been authenticated.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To accomplish the foregoing, certain illustrative aspects of the invention are described in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 2 illustrates an example of a client terminal that may be used with the present invention;

DETAILED DESCRIPTION

It is noted that in this disclosure and particularly in the claims and/or paragraphs, terms such as "comprises," "comprised," "comprising," and the like can have the meaning attributed to them in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution.

For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
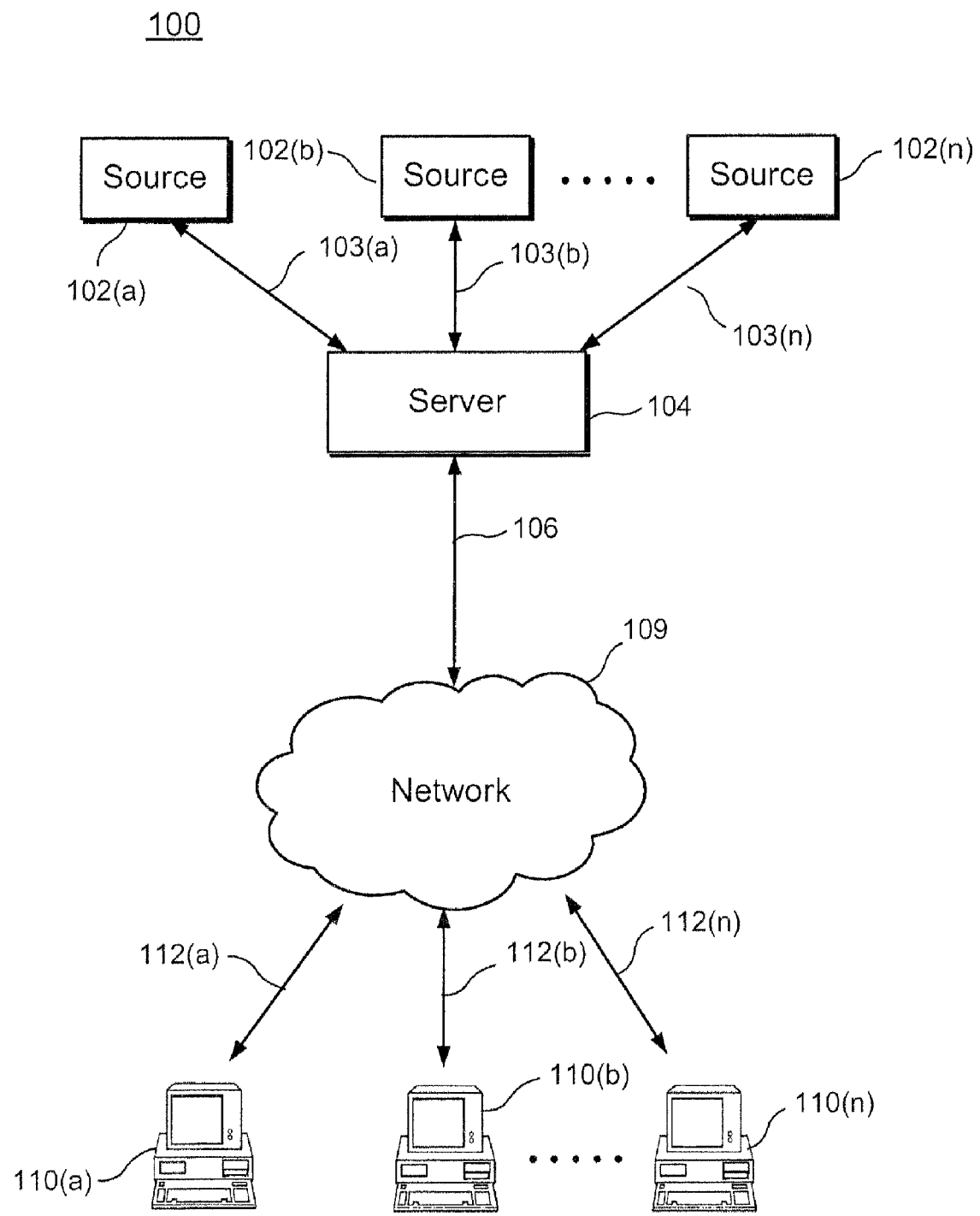
FIG. 1 illustrates a network environment that supports the present invention.

FIG. 1 shows a network environment 100 that supports the present invention. Specifically, the exemplary environment 100 includes a network 109, a plurality of advertisement data sources 102(a) . . . (n) (where "n" is any suitable number), a server apparatus 104, and a plurality of processing devices, or client terminals, 110(a) . . . (n) (where "n" is any suitable number). The processing devices 110 may be integral to a display device, in which case they may be deemed display processing modules that control a graphical user interface (GUI) of the display device. Alternatively, the processing devices 110 may be disposed in a separate housing and be operatively coupled to a display device. The processing devices 110 may request data from the server 104 through the network 109.

The network 109 is, for example, any combination of linked computers, or processing devices, adapted to transfer (transmit and/or receive) and process data. The network 109 may include wireless and wired transmission capabilities. The network 109 may be a private internet protocol (IP) network, as well as a public IP network, such as the Internet that can utilize World Wide Web (www) browsing functionality. Alternatively, the network 109 may be an Ethernet network, or any two or more operatively coupled processing devices that can share information. An example of a wired network is a network that uses communication busses and MODEMS, or digital subscription lines (DSL), or a local area network (LAN), or a wide area network (WAN) to transmit and receive data between the processing devices 110 and the server 104. An example of a wireless network is a wireless LAN. Global System for Mobile Communication (GSM) is another example of a wireless network. The GSM network is divided into three major systems which are the switching system, the base system, and the operation and support system. Also IEEE 802.11 (Wi-Fi) is a commonly used wireless network in computer systems, which enables connections to the Internet or other machines that have Wi-Fi functionality. Wi-Fi networks broadcast radio waves that can be picked up by Wi-Fi receivers that are attached to different computers.

The server apparatus 104 is, for example, one or more computer processing devices each with electronic memory and processing capability (generally referred to as server device 104). Server device 104 is typically dedicated to server functionality and is operatively connected to sources 102(a) . . . 102(n) (where "n" is any suitable number) via a corresponding bi-directional wired or wireless communication link 103(a) . . . (n). Server apparatus 104 is operatively connected to network 109 via a bi-directional wired or wireless communication link 106. The server apparatus 104 is operable to receive, store, process, and transmit data to and from content sources 102. Server apparatus 104 is also operable to receive, store, process, and transmit data to and from the network 109 via communication link 106. Server device 104 may also store and/or access archived video data that may be compressed or otherwise stored on server device 104. The server 104 may access stored or archived data from a remote location, such as a remote storage location and store the data in memory at server apparatus 104. Server apparatus 104 is described in greater detail in relation to FIG. 3.

Sources 102 are typically any source of advertisement data, such as electronic advertisement data, and online advertisement data, including postings from online advertising networks, online stores, online auctions, online dating services, web blogs, etc. Advertisements may relate to new or used goods or services for stated prices that may be negotiable or nonnegotiable.

Client terminals, or processing devices, or appliances 110 are, for example, a PC (personal computer) laptop computer, electronic tablet, handheld PDA, mobile telephone, pocket computer, palmtop computer, or any electronic device that has web browsing and/or Internet capability (connectivity capability) and display and memory capability. Processing devices 110 are operatively connected to network 109 via an associated bi-directional wired or wireless communication link 112(a) . . . (n). Processing devices 110 are operable to receive one or more data streams from source 102 through the server apparatus 104 and the network 109. Processing devices 110 are also operable to transmit data to server apparatus 104 through network 109.

FIG. 2 illustrates an example of a client terminal, or processing device, 110 that may be used with the present invention. Processing device, or client terminal, 110 is adapted to receive, store, manipulate, process, and transmit data related to embodiments of the present invention. The processing device 110 includes a display unit 114, an input module 118, and a processor unit 108, which includes a CPU 202 and a memory module 204. The client terminal 110 is coupled to a network, as described in relation to FIG. 1 via bidirectional communication channel 112.

Image display unit, or module, 114 is coupled to processor unit 108 via bidirectional communication medium 136, which is typically a bus or wired connection. The display unit 114 is used to display the content data generated by the sources 102 and provided by server apparatus 104 (shown in FIG. 1). The display unit 114 may be, for example, a monitor, LCD (liquid crystal display), a plasma screen, a graphical user interface (GUI) or other module adapted to display output data typically by a representation of pixels.

Input module 118 is coupled to processing unit 108 via bidirectional communication medium 134, which is typically a bus or wired connection. The input module 118 may include devices such as a keyboard, mouse, track ball and/or touch pad or any combination thereof.

The CPU 202 is typically a processor that includes an arithmetic logic unit (ALU) (not shown), which performs arithmetic and logical operations, and a control unit (CU) (not shown), which extracts instructions from memory and decodes and executes them, utilizing the ALU when necessary.

Memory module 204 is typically an electronic storage medium such as RAM, ROM, EEPROM or other memory device, such as an optical disk, optical tape, CD, or a floppy disk, a hard disk, memory stick, thumb drive, or a removable cartridge, which may be inserted into a port (e.g., a USB port) or interconnector, on which digital information is stored in the form of bits. It may also include recorders to record to and read from mass storage devices such as, for example, optical disks, magnetic disks, flash semiconductor disks, and other types of storage that may be temporary or permanent.

The memory module 204 stores programs 206, which include, for example, a web browser module 208, algorithm module 400, advertisement data module 212, rating data module 218, comment data module 220 and trusted party module 228 as well as typical operating system programs (not shown), input/output programs (not shown), and other programs that facilitate operation of processing device, or client terminal 110.

Web browser module 208 stores a web browser program that is, for example, an Internet browser program such as Internet Explorer®. Algorithm storage module 400 stores an algorithm, which is a series of steps for accessing, manipulating, and/or processing selected data, that is typically stored in a computer-readable memory. Algorithm 400 is discussed in more detail in relation to FIG. 4. Advertisement data storage module 212 may store content data received from source 102.

Rating module 218 is a storage location in memory 204 that is adapted to store rating data related to a particular advertising party and/or website. This rating data can be updated based on a user's experience with a particular vendor. A user can access the rating data when the user initiates a transaction with a particular online vendor. Thus, if a user begins an online transaction with a vendor that has an associated rating, the user can access the rating data to determine whether they want to complete the transaction. For example, if a user views an online advertisement from XYZ company, the user can check whether there is any rating data for XYZ company. This rating data is generated when a user deals with an online vendor such that a subsequent transaction with a vendor will access the previously generated rating data.

Similar to rating module 218, comment data module 220 is a storage location in memory 204 that a user can store comment data about an online vendor generated by a user. Thus, when a user conducts a transaction they can generate comment data related to the vendor. This comment data will be available during a subsequent transaction with that vendor. Thus, if a user does not wish to deal with a certain person at XYZ company, the user can make a note to that effect and store it in the comment data module 220.

Trusted party module 228 is a storage location in memory 204 that stores primary trusted party data, secondary trusted party data, third trusted party data up to "N" party data. This trusted party data is particular for each user and can be modified based on a user experience with an online vendor.

Figure 3:
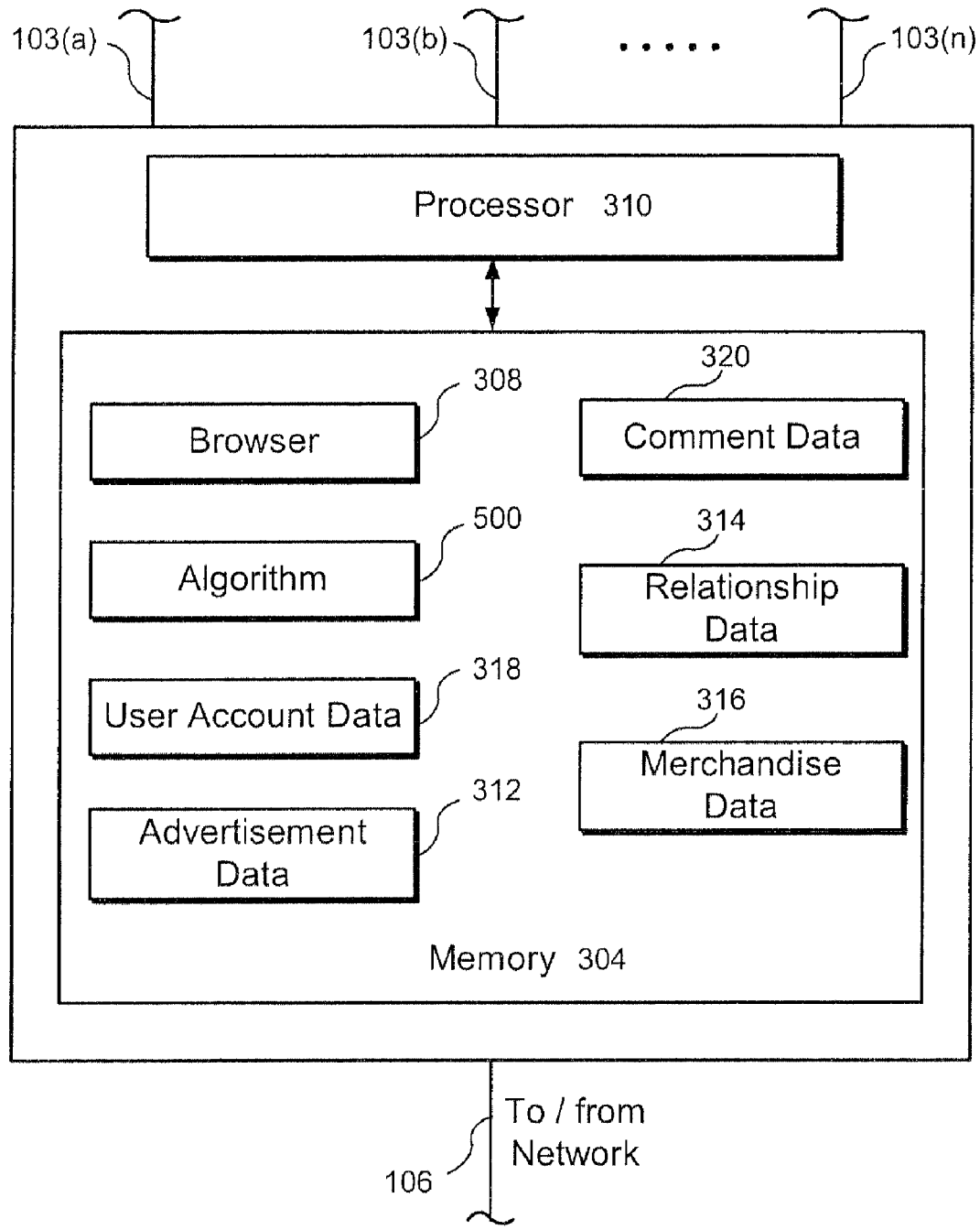
FIG. 3 illustrates an example of a server device that may be used with the present invention.

FIG. 3 illustrates an example of a server device, or server apparatus 104 that may be used with embodiments of the present invention. The server apparatus 104 is adapted to receive, store, manipulate, process, and transmit data related to embodiments of the present invention. The server apparatus includes processor module 310, memory module 304.

Processor module 310, which is operatively connected to memory module 304, is used to process, store, and manipulate data received from sources 102 and from client terminals described herein.

The server apparatus 104 may respond to requests from the processing devices, or client terminals (shown as element 110 in FIG. 1) via interconnector 106, which is typically a bidirectional communication channel such as a bus, wired or wireless connection. The server apparatus 104 may also receive content data from sources, such as sources of electronic or online advertisement data, via interconnectors 103 (*a*) . . . (n). The interconnectors 106 and 103 represent data paths, which may or may not use a common bus or medium.

The server apparatus 104 includes processor module 310 which is in communication with memory module 304.

Memory module 304 is typically an electronic storage medium such as RAM, ROM, EEPROM, or other memory device, such as an optical disk, optical tape, CD, or a floppy disk, hard drive, portable memory stick that can be inserted into a port (such as a USB port) or other communications connector, or a removable cartridge, on which information is stored. The memory module 304 may also store for example, a web browser module 308, an advertisement data storage module 312, relationship data storage module 314, which typically stores a relationship of a source to a user, such as whether the source is a trusted primary source or a trusted secondary source or more removed trusted source (N-degree), user account storage module 318, merchandise storage module 316, an algorithm storage module 500, comment data 320 as well as typical operating system programs (not shown), input/output programs (not shown), and other programs that facilitate operation of server 104.

Web browser module 308 stores a web browser program that is, for example, an Internet browser program such as Internet Explorer®. Algorithm storage module 500 stores an algorithm, which is a series of steps for accessing, manipulating, and/or processing selected data, that is typically stored in a computer-readable memory and executed by the processor 310.

User account data module 318 stores user account information such as user name, credit card number, address, account balance and other information related to a user. Advertisement data module 312 stores advertisement data accessed by a user. This advertisement data can be processed with relationship data (stored in module 314) to determine whether the source of the advertisement data can be authenticated as a trusted source. Comment data module 320 is used to store comment data from a plurality f users about a plurality of sources. This data can be used to generate a rating, prohibit certain sources from being accessed (i.e., due to poor ratings or comments) or otherwise be utilized to provide information to users.

Relationship data module 314 stores one or more providers or sources for each user and an indicator that indicates whether the source is authentic, i.e. has a favorable relationship with the user. This relationship indicator, or rating can be provided by the user, modified by the user, or generated by the processor 310, based on favorable comments by the particular user or other users who have dealt with the source and have had a favorable experience.

Merchandise data module 316 stores a record of merchandise or services purchased by the user, the source and a rating of the source. Thus, when a user wishes to conduct an on-line transaction, the merchandise data module 316 provides a record of previous on-line transactions conducted by the user.

Figure 4A:
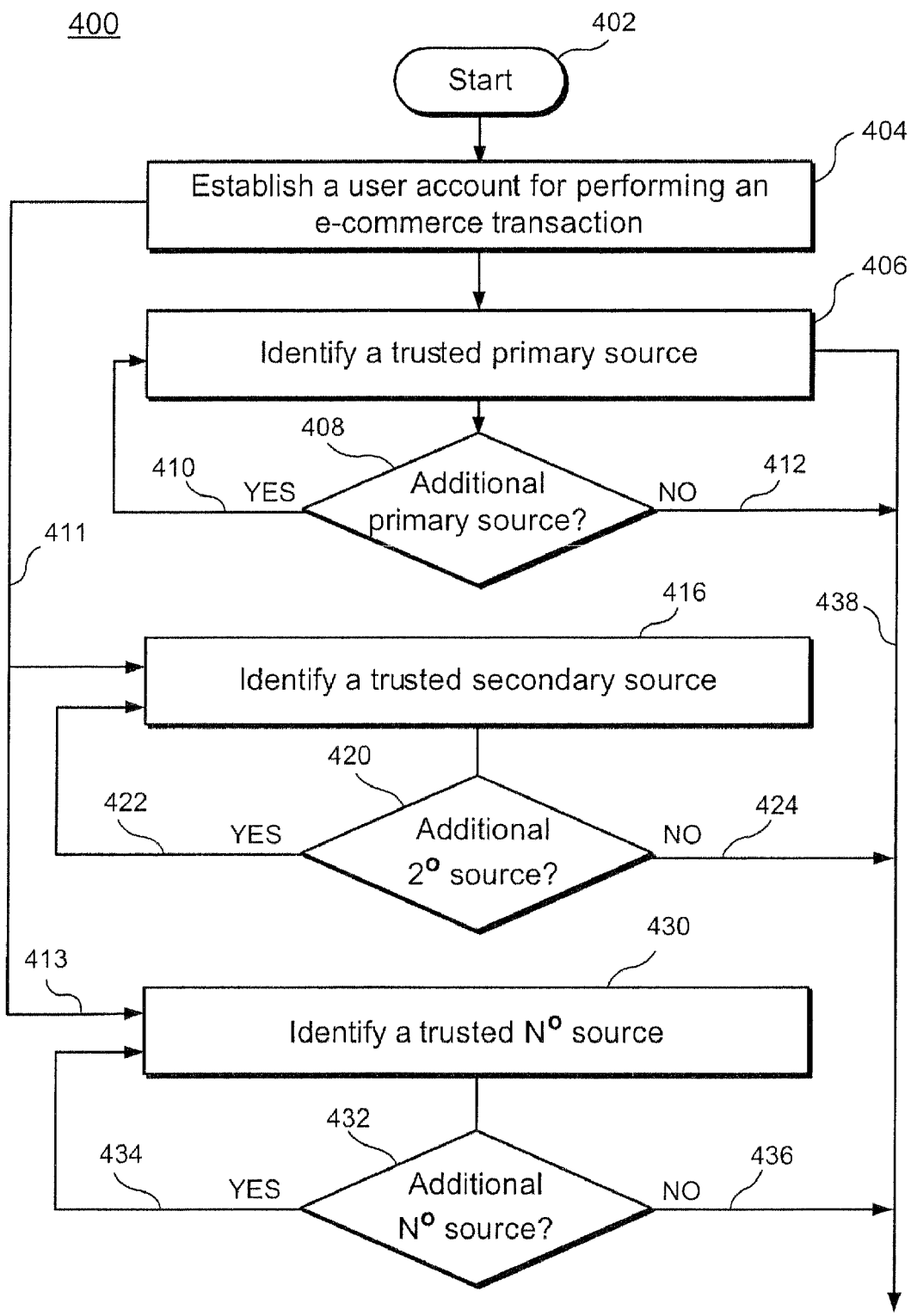
FIG. 4 illustrates a flowchart of steps for one embodiment of the present invention.
Figure 4B:
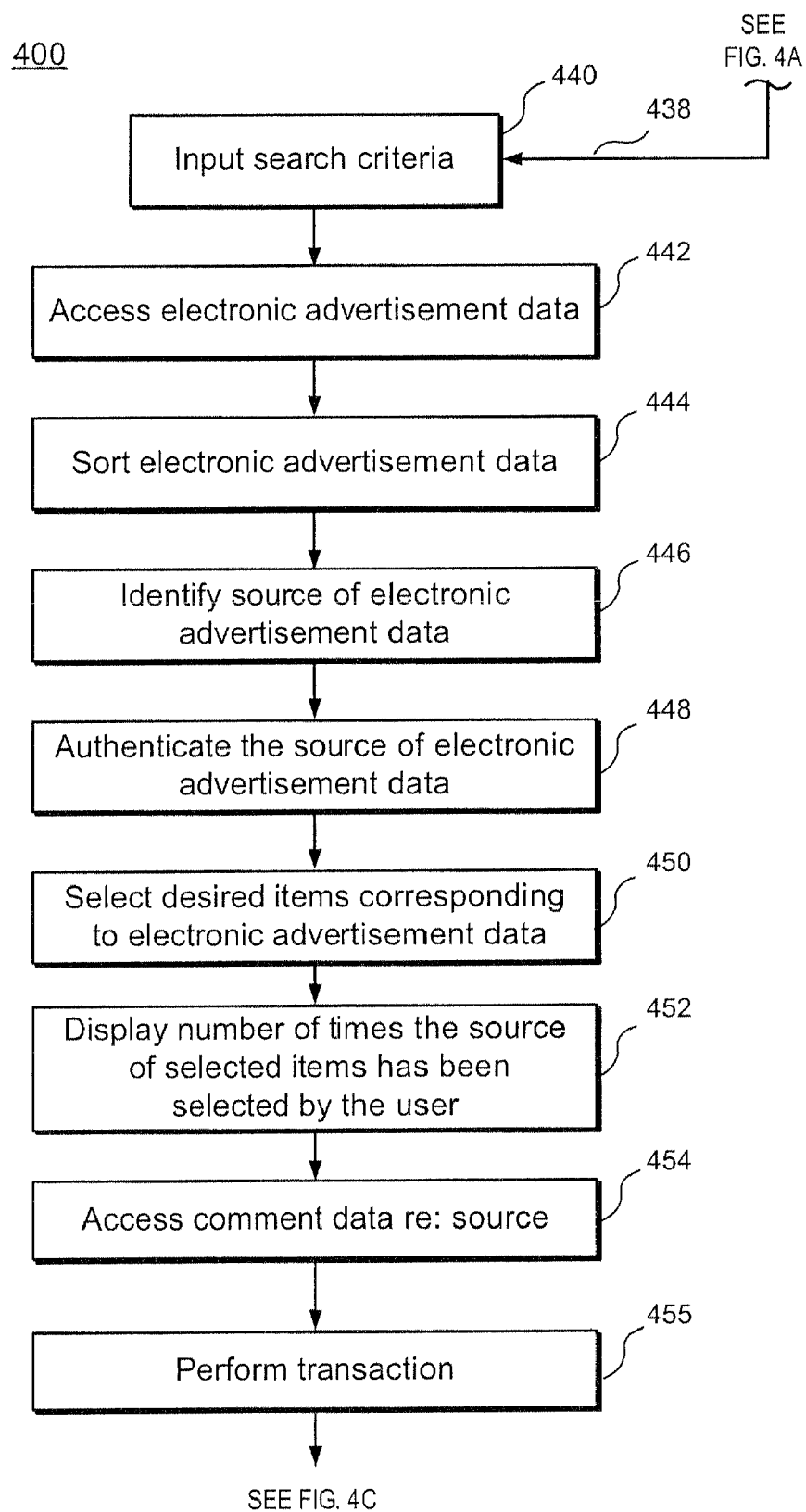
Figure 4C:
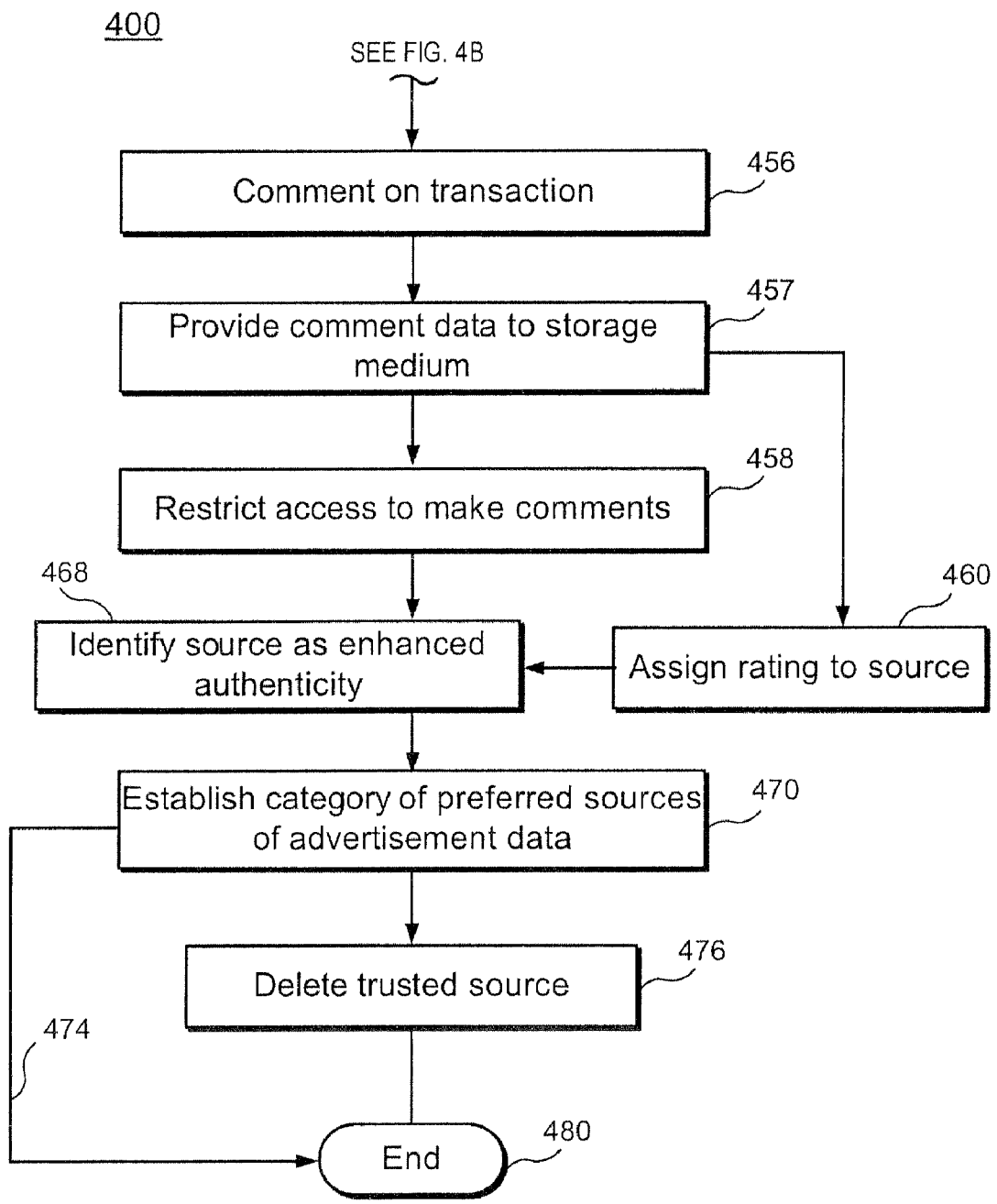

FIG. 4 illustrates a flowchart of steps for one embodiment of the present invention. As shown in FIG. 4, process 400 is a series of steps, typically stored on a computer-readable medium that may be executed by a processing device to implement an embodiment of the present invention. The process 400 may be stored on any suitable electronic medium, such as RAM, ROM, EEPROM or other memory device, such as an optical disk, optical tape, CD, or a floppy disk, a hard disk, memory stick, thumb drive, or a removable cartridge. The process, as shown by the steps of flowchart 400 may be stored on an electronic medium, and the CPU, when executing the program code of the algorithm, is a processing module adapted to perform the recited functionality.

As shown in FIG. 4, step 402 begins execution of the process. A user account is established for a user, as shown in step 404. The user account enables the user to perform e-commerce transactions. There may be many users, each having an associated user account. Each user account can be password protected, or may require the use of a pre-authorized access code, PIN (personal identification number) or otherwise have restricted access. As will be discussed in more detail herein, a user will typically only have access to their user account and will not have access to another user's account, unless given permission or otherwise authorized to have access. The user account is utilized to perform an electronic transaction or e-commerce transaction, such as purchasing a product or service over a network, such as the Internet.

A trusted primary source is identified in step 406. The trusted primary source is identified by the user of the particular associated user account. A single user account may identify a plurality of trusted primary sources. Thus, each user account will have corresponding associated trusted primary sources. The trusted primary source is, for example, an online vendor of goods or services, offered via the network, such as the Internet. The trusted primary source may host a website or otherwise advertise products and/or services via electronic media. A trusted primary source typically attains such status by the user identifying the source as trustworthy. This may be done by the user inputting identifying information into an electronic storage medium, such as memory at the server (identified as element 104 in FIG. 1 herein) or by "clicking" a menu or button on the website of the provider indicating that the user had a positive transaction and would like to do business (conduct electronic transactions) with the provider, or source, in the future. The identification of a source, or provider, as a trusted source is typically stored in a data table, look-up table or other matrix or data structure format that correlates the identified source with the appropriate user account. Thus, a trusted primary source for user "A" is not necessarily a trusted primary source for user "B". Thus, generally, merely because one user has had a favorable on-line business relationship with a particular vendor, that vendor may be a trusted source for that user; but that vendor would not be a trusted source for another user. Therefore, the status of "trusted source" is particular for each user account.

The identification of a trusted primary source is iterative and a user may identify as many sources as trusted primary sources as desired. Indeed, at a later point in time a user can identify a source or provider as a trusted primary source. For example a user may have a family member or close friend who has an internet site offering products. While that source may not be a trusted source for any other user since the first user has a pre-established relationship, the source is a trusted source for the particular user. Thus a family member or friend may be a trusted source even though the user has never conducted an online transaction with that source.

As shown in step 408, a user may identify additional trusted primary sources. This may typically be the result of a user finding out about a positive experience from another, conducting an online transaction with a favorable result and adding the vendor as a trusted primary source. Thus, "yes" line 410 shows that additional trusted primary sources can be added to a user account. Line 412 shows that line 438 is reached, which leads to step 440, which is inputting search criteria (described in more detail below).

In addition to trusted primary sources, trusted secondary sources may also be identified. For example, if a user has heard of a vendor or has reason to believe a vendor is reliable, line 411 shows that such a trusted secondary source may be identified in step 416.

Similar to trusted primary sources, step 420 provides an opportunity for a user to identify additional trusted secondary sources. "Yes" line 422 shows that a plurality of trusted secondary sources may be associated with a particular user account. Line 424 shows that line 438 is reached, which leads to step 440, which is inputting search criteria (described in more detail below).

Furthermore N-level trusted sources may be identified, as shown in step 430, which is reached via line 413. The N-level sources may have a less-close connection to the user than the trusted primary and trusted secondary sources. Indeed, the classification of a source as "primary" "secondary" "third" . . . "N" (where "N" is any suitable number) can be dynamically adjusted based on a user's interaction with the source. Thus, a primary source can be changed to a secondary or third if the user does not have a favorable e-commerce transaction, or for any other reason. Step 432 shows that a user may add additional trusted N-level sources.

"Yes" line 434 shows that a plurality of trusted N-level sources may be associated with a particular user account. Line 436 shows that line 438 is reached, which leads to step 440, which is inputting search criteria (described in more detail below).

Step 440 shows that a user can initiate a search for an ecommerce transaction, such as buying or selling a product or service. Performing a search is reached once trusted sources have been identified, as described above. Step 442 shows that advertisement data for a product or service may be accessed and/or retrieved by a user. The electronic advertisement data may be sorted, as shown in step 444. The sorting may be performed based on an identifier that shows a particular source has been dealt with previously by the user. Step 446 shows that the source of the advertisement data can be identified. More particularly, a determination is made whether the source of the advertised product/good/service is an entity that the user has conducted a transaction with previously. If so the source of the advertisement is authenticated, as shown in step 448. Step 450 shows that desired items may be selected that correspond to the electronic advertisement data. The number of times the user has dealt with the particular source is accumulated and displayed, as shown in step 452. Thus, a user who conducts many online transactions has a record of how many times in the past the user has conducted business with this source. Additionally, step 454 shows that the user can access comment data that other online purchasers or sellers have posted about the source. Step 455 shows that the user conducts a transaction with the source.

The user may also post comments related to the transaction, as shown in step 456. This comment data will be available to other users who may be considering conducting an online transaction with the source in the future. The user may also update the status of the source based on the transaction. The identification of a source as a trusted primary, secondary or third or N-level source can be modified, based on the most recent transaction between the user and a source. The comment data may be stored, as shown in step 457. The user may then retrieve the comment data at a later time in case the user is considering conducting business with the vendor and does not remember whether the vendor was trustworthy or not. A rating may be assigned to the source, based on the comments, as shown by step 460. This rating may be a number between for example, "1" and "5" representing a sliding scale of acceptability, with "5" being superior and "1" being unfavorable.

Access to the comment data may be restricted, as shown in step 458. This is to prevent a single disgruntled user from unfairly and improperly tarnishing the reputation of a source.

Step 468 shows that a particular source may be identified as having enhanced authenticity with a user based on repeated and consistent favorable ratings. Indeed, when a source has an average rating that exceeds a threshold, that source may be identified as having increased authenticity. This rating may provide that the source is listed first in a search by the user. Thus when a user performs a search on the network, such as the Internet, sources with enhance authenticity will be listed first. Thus a user will not have to scroll through numerous "hits" from a search to identify favored sources. Also, since the status is dynamically updated, the list is current and represents the present state of the relationship between the user and source.

Step 470 shows that a category of preferred sources can be established. Thus, when a user performs a search, only preferred sources will be retrieved. Step 476 shows that a user can delete a source in the event that source either has a low average rating or the user no longer wishes to conduct any business with that source.

Step 480 shows that the process ends.

Figure 5A:
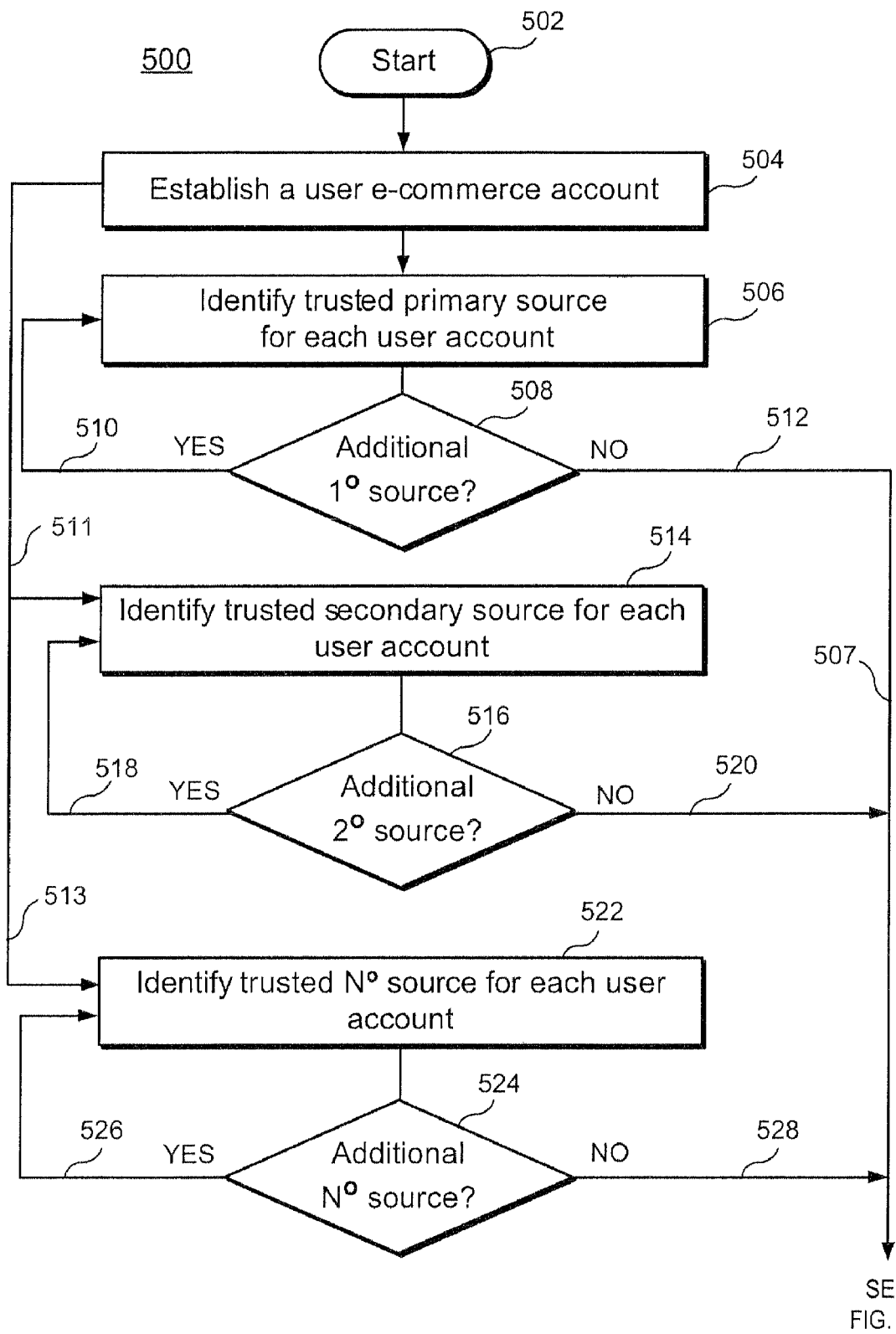
FIG. 5 illustrates a flowchart of steps for another embodiment of the present invention.
Figure 5C:
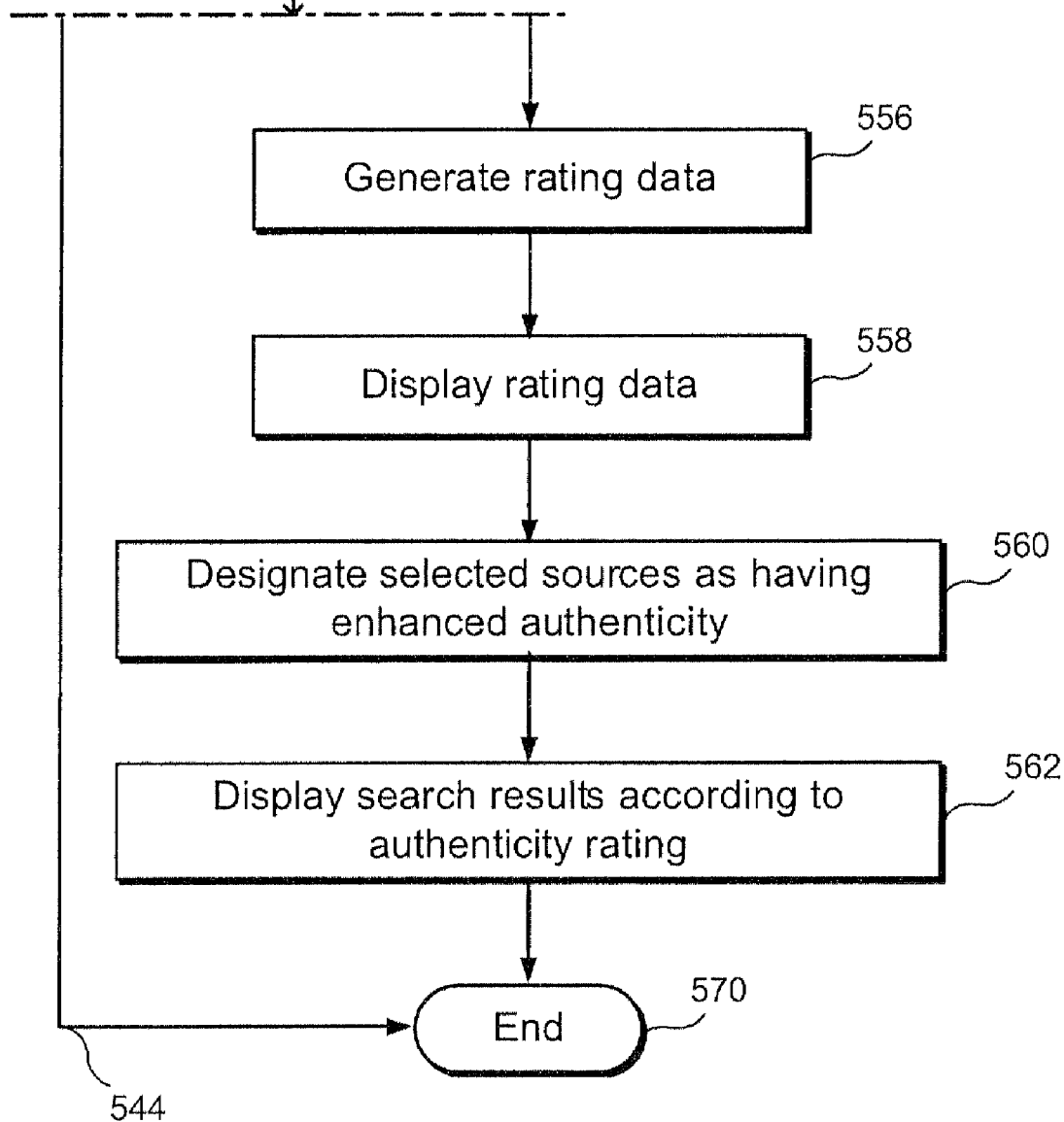

FIG. 5 illustrates a flowchart of steps for one embodiment of the present invention. As shown in FIG. 5, process 500 is a series of steps, typically stored on a computer-readable medium that may be executed by a processing device to implement an embodiment of the present invention. The process 500 may be stored on any suitable electronic medium, such as RAM, ROM, EEPROM or other memory device, such as an optical disk, optical tape, CD, or a floppy disk, a hard disk, memory stick, thumb drive, or a removable cartridge. The process, as shown by the steps of flowchart 500 may be stored on an electronic medium, and the CPU, when executing the program code of the algorithm, is a processing module adapted to perform the recited functionality.

As shown in FIG. 5, step 502 begins execution of the process. A user establishes an e-commerce account as shown in step 504. One way that this is accomplished is by a user signing up via a website that includes a form or other interface for a user to input account information such as name, address, personal identification number (PIN) authorization code or information, credit card number and billing address. Other information could also be included if desired. There may be many users, each having an associated user account. Each user can identify a trusted primary source associated with the particular user, as shown in step 506. For example, if a user has a trusted relative or friend with a website, or other e-commerce site, or the user has previously dealt with an online vendor and had a favorable experience, the user can identify that site or URL (uniform resource locator) as a trusted primary source. The user can identify a plurality of trusted primary sources, as shown by step 508. If a user wishes to identify additional trusted primary sources, "yes" line 510 leads to step 506. Line 511 shows that the user can identify trusted secondary sources, as shown in step 514. A trusted secondary source has a lower level of trust than that of a trusted primary source. For example, a trusted secondary source may be an advertiser, or web site that a user has heard is trustworthy, or has had a previous experience that was favorable. The trusted secondary source typically has a lower degree of trustworthiness than a trusted primary source.

Step 516 provides an opportunity for a user to identify additional trusted secondary sources. "Yes" line 518 shows that a plurality of trusted secondary sources may be associated with a particular user account.

Line 520 shows that searching step 530 is reached via line 507 when the user has identified all secondary trusted sources.

A user may identify trusted N-degree sources, as shown in step 522, reached via line 513. The trusted N-degree sources may have a less-close connection to the user than the trusted primary and trusted secondary sources. Indeed, the classification of a source as "primary" "secondary" and "third" or "N-degree" can be dynamically adjusted based on a user's interaction with the source. Thus, a primary source can be changed to a secondary or third or even removed from a favored status, if the user does not have a favorable e-commerce transaction, or for any other reason. Step 524 shows that a user may add additional trusted "N-degree" sources. Indeed "yes" line 526 shows that additional trusted "N-degree" sources can be identified. When there are no additional "N-degree" trusted sources, line 528 shows that searching step 530 is reached, via line 507. Searching is performed by a user seeking information regarding an ecommerce transaction, or online advertisement, as shown in step 530. Electronic advertisement data is accessed in response to a user search criteria, or request, as shown step 532.

A determination of the source of the electronic advertisement data is made, as shown in step 534. Thus, advertising data is viewed and a source of the advertisement data is verified. The verification, or determination, may be made by identifying a URL of the website, or advertising data.

The source of the electronic advertising data is authenticated, as shown in step 536. Step 540 shows that approval of the advertising source as a trusted provider is performed. If the source is authorized or approved, "yes" line 542 shows that a transaction is facilitated between the user and the web site, as shown in step 546. This transaction is typically an online transaction, or ecommerce transaction.

It is an embodiment of the present invention that if the source is not approved, the user does not perform a transaction. Thus, line 544 shows that end step 570 is reached if the source of online advertising is not authenticated.

Step 550 shows that comments related to a particular transaction can be received by the server. These comments can be organized, edited and categorized such that a profile of an online vendor may be generated. This profile can be displayed on the website.

Thus, users may a post comments related to the transaction, which can be available to other users who may be considering conducting an online transaction with the source in the future. Also, the user's comments may be modified, based on the most recent transaction between the user and a source.

Access to the comment data may be restricted by the website, as shown in step 552. This restricted access applies to preventing particular users from posting comments as well as restricting disclosure of the comment data to particular users. The restricted access prevents a single disgruntled user from unfairly and improperly tarnishing the reputation of a source.

Step 554 shows that the comment data is accumulated from the various users who have posted comments related to a particular online vendor. A rating for an online vendor may be generated, as shown in step 556. This rating may be a number between for example, "1" and "5" representing a sliding scale of acceptability, with "5" being superior and "1" being unfavorable.

This rating may be displayed on the website when the online vendor is accessed, as shown in step 558. The website can also designate an online provider as having increased authenticity based on the generated rating, as shown in step 560. This is a "stamp of approval" reserved for online vendors ho have met the requirements for preferred authenticity.

Thus, a particular source may be identified as having enhanced authenticity with a user based on repeated and consistent favorable ratings, as shown in step 560. Indeed, when a source has an average rating that exceeds a threshold, that source may be identified as having increased authenticity. This rating may provide that the source is listed first in a search by the user. Thus when a user performs a search on the network, such as the Internet, sources with enhance authenticity will be listed first. Thus a user will not have to scroll through numerous "hits" from a search to identify favored sources. Also, since the status is dynamically updated, the list is current and represents the present state of the relationship between the user and source. Step 562 shows that the search results may be displayed as a function of the authenticity rating of the on-line source. Thus more trustworthy sources are displayed ahead of less trustworthy sources.

The process ends, as shown in step 570.

Figure 6:
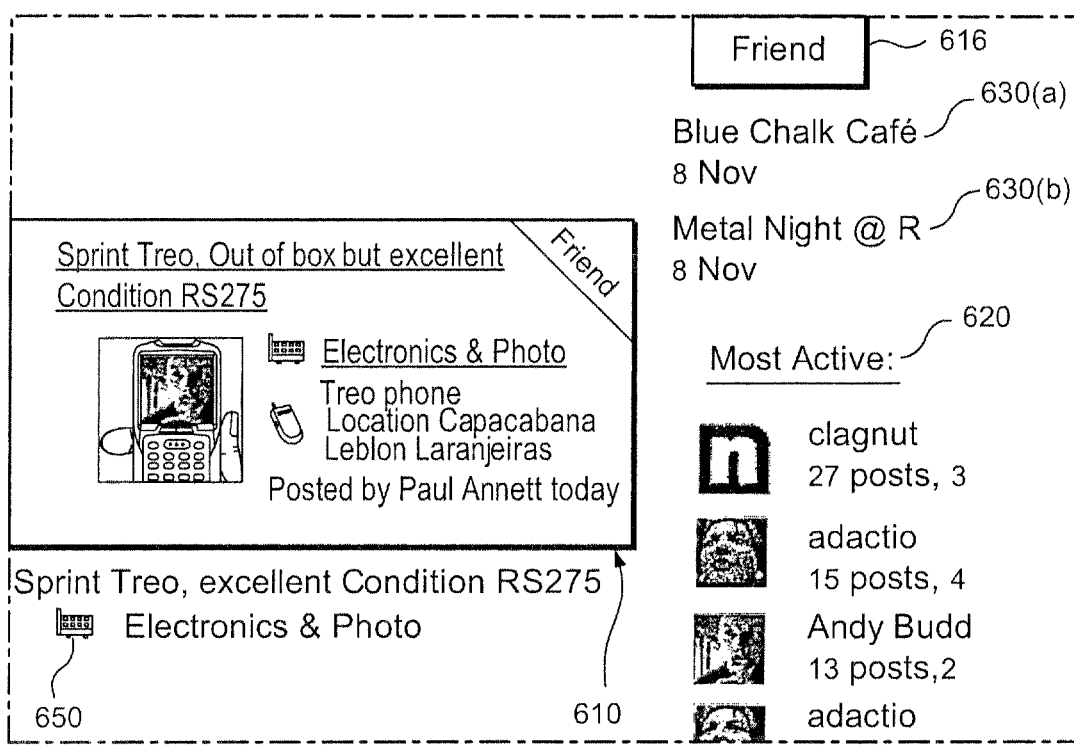
FIG. 6 illustrates an example of a screenshot according to an embodiment of the present invention.

FIG. 6 shows one example of a screen shot according to the present invention. As shown in FIG. 6, a screenshot 600 of a web page includes an identifier 616. As shown in FIG. 6, element 616 is displayed in the upper right corner of an advertisement, and is highlighted and the word "FRIEND" is displayed to indicate that the advertisement was posted by a "friend" of the user. Portion 610 shows that advertisement data is displayed on the screenshot 600. Area 650 shows that additional data may also be displayed and area 620 shows a list of the most active webpages is displayed. Element 630(*a*) and 630(*b*) show that additional webpages, or listing of webpages may also be displayed.

Figure 7:
FIG. 7 illustrates another example of a screenshot according to the present invention.

FIG. 7 shows another example of a webpage. The elements of FIG. 7 are similar to those shown in FIG. 6 with a "700" series identifier.

Thus, the present invention provides a system for allowing a first user to designate other users as "friends," a means for indicating to said first user that one of said "friends" posted an advertisement, and a means for indicating to said first user that one of said "friends" designated "friends" posted an advertisement creating the first user's extended network, wherein said first user's extended network includes all users designated as friends of those users designated by said first user as a "friend."

The system additionally comprises displaying on a website's homepage any items posted by said first user's friends or said first user's extended network.

Yet another embodiment of the present invention is directed to the system described above and also includes a searching means wherein the searching means may comprise a simple keyword search, a search of said first user's friends or network, or an advanced search that allows said first user to search by tag, date, type, location, cost, or some combination thereof.

It will be appreciated from the above that the invention may be implemented as computer software, which may be supplied on a storage medium or via a transmission medium such as a local-area network or a wide-area network, such as the Internet.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A computer-readable non-transitory storage medium embodying a computer-readable program that, upon execution by a computer, causes the computer to perform a method of providing electronic advertisements, said method comprising:
    establishing one or more trusted primary sources;
    establishing one or more trusted secondary sources, the trusted secondary sources being a function of one or more trusted primary sources;
    accessing electronic advertisement data;
    authenticating a source of the electronic advertisement data by verifying that the source of the electronic advertisement data is either a trusted primary source or a trusted secondary source;
    determining whether a source rating exceeds a threshold based on repeated and consistent favorable ratings;
    assigning increased authenticity to each source whose rating exceeds the threshold;
    displaying, for selection, on a display means one or more items corresponding to electronic advertisement data from an authenticated source,
    wherein sources identified as having increased authenticity are displayed first on the display means;
    performing an e-commerce transaction relating to the one or more items when the source of the electronic advertisement data has been authenticated, wherein the e-commerce transaction comprises buying or selling a product or service;
    receiving and storing comment data entered into a computer by a user, the comment data comprising one or more user comments related to a particular transaction between the user and the source;
    assigning a rating of 1 to 5 to the transaction based on the comment data;
    determining whether a source status of the source is modified based on the transaction between the user and the source;
    searching the electronic advertisement data utilizing one or more search criteria, wherein the search criteria is selected from a group that includes each of: tag data, date data; location data, cost data, and comment data;
    sorting the electronic advertisement data utilizing one or more sorting criteria, wherein the sorting criteria is selected from a group that includes each of: geographic location, age, or condition of the good or services; and
    displaying a number of times that a particular electronic advertisement has been accessed.

2. The method of claim 1, further comprising accessing comment data associated with particular electronic advertisement data; and displaying the comment data.

3. The method of claim 2, further comprising restricting access to the comment data.

4. The method of claim 1, further comprising associating selected electronic advertisement data with an identifier to facilitate subsequent retrieval of the electronic advertisement data.

5. The method of claim 1, further comprising establishing a category of preferred sources of electronic advertisement data.

6. A computer-readable non-transitory storage medium embodying a computer-readable program that, upon execution by a computer, causes the computer to perform a method of providing online advertisements, said method comprising:
    establishing one or more user accounts for an associated user;
    establishing one or more trusted primary sources for each user account;
    establishing one or more trusted secondary sources for each user account, the trusted secondary sources being a function of one or more trusted primary sources;
    accessing electronic advertisement data in response to a user's command;
    identifying a source of the electronic advertisement data;
    authenticating the source of the electronic advertisement data by verifying that the source is either a trusted primary source or a trusted secondary source associated with the user account;
    determining whether a source rating exceeds a threshold based on repeated and consistent favorable ratings;
    assigning increased authenticity to each source whose rating exceeds the threshold;
    displaying, for selection, on a display means one or more items corresponding to electronic advertisement data from an authenticated source,
    wherein sources identified as having increased authenticity are displayed first on the display means;
    facilitating an e-commerce transaction when the source of the electronic advertisement data has been authenticated, wherein the e-commerce transaction comprises buying or selling a product or service;

receiving and storing comment data entered into a computer by a user, the comment data comprising one or more user comments related to a particular transaction between the user and the source;

assigning a rating of 1 to 5 to the transaction based on the comment data;

determining whether a source status of the source is modified based on the transaction between the user and the source;

searching the electronic advertisement data utilizing one or more search criteria, wherein the search criteria is selected from a group that includes each of: tag data, date data; location data, cost data, and comment data;

sorting the electronic advertisement data utilizing one or more sorting criteria, wherein the sorting criteria is selected from a group that includes each of: geographic location, age, or condition of the good or services; and displaying a number of times that a particular electronic advertisement has been accessed.

7. The method of claim 6, further comprising regulating access to comment data associated with particular electronic advertisement data.

8. The method of claim 7, further comprising restricting access to the comment data.

9. The method of claim 6, further comprising associating selected electronic advertisement data with an identifier to facilitate subsequent retrieval of the electronic advertisement data.

10. The method of claim 6, further comprising establishing a category of preferred sources of electronic advertisement data.

\* \* \* \* \*